(12) United States Patent
Vijayasankar et al.

(10) Patent No.: US 9,450,708 B2
(45) Date of Patent: Sep. 20, 2016

(54) SYSTEM AND METHOD FOR AVOIDING HIDDEN NODE COLLISIONS IN A COMMUNICATION NETWORK

(71) Applicant: TEXAS INSTRUMENTS INCORPORATED, Dallas, TX (US)

(72) Inventors: Kumaran Vijayasankar, Allen, TX (US); Ram Krishnan, Chapel Hill, NC (US); Ramanuja Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 103 days.

(21) Appl. No.: 14/246,872

(22) Filed: Apr. 7, 2014

(65) Prior Publication Data

US 2014/0301409 A1 Oct. 9, 2014

Related U.S. Application Data

(60) Provisional application No. 61/808,885, filed on Apr. 5, 2013, provisional application No. 61/831,377, filed on Jun. 5, 2013.

(51) Int. Cl.
*H04L 1/16* (2006.01)
*H04L 29/08* (2006.01)

(52) U.S. Cl.
CPC ............... *H04L 1/16* (2013.01); *H04L 1/1671* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 6,987,770 B1* | 1/2006 | Yonge, III | ............ | H04L 1/0083 370/401 |
| 2003/0103521 A1* | 6/2003 | Raphaeli | ................ | H04B 3/542 370/445 |
| 2003/0105877 A1* | 6/2003 | Yagiu | ........................ | H04L 1/16 709/237 |
| 2004/0120292 A1* | 6/2004 | Trainin | ................... | H04L 1/188 370/338 |
| 2005/0021999 A1* | 1/2005 | Touitou | ............... | H04L 63/1458 726/11 |
| 2005/0141548 A1* | 6/2005 | Koo | .................. | H04W 72/1242 370/462 |
| 2007/0076742 A1* | 4/2007 | Du | ......................... | H04L 47/14 370/445 |
| 2008/0146263 A1* | 6/2008 | Shiouchi | ........... | H04W 74/0808 455/517 |
| 2012/0230205 A1* | 9/2012 | An | ....................... | H04W 28/044 370/242 |
| 2014/0351832 A1* | 11/2014 | Cho | ...................... | H04L 67/141 719/328 |

* cited by examiner

*Primary Examiner* — Chi H Pham
*Assistant Examiner* — Vladislav Agureyev
(74) *Attorney, Agent, or Firm* — John R. Pessetto; Frank D. Cimino

(57) ABSTRACT

Method and apparatus for avoiding hidden node collisions in a communication network. A network communication device includes a packet transmitter. The packet transmitter is configured to subdivide a packet to be transmitted via a communication network into a plurality of segments based on the packet exceeding a predetermined maximum size, and to sequentially transmit the segments via the communication network. The packet transmitter is also configured to construct an acknowledgement packet responsive to reception of each segment of a packet received via the communication network. The acknowledgement packet includes a field indicating whether an additional segment of the packet is to be transmitted via the communication network. The packet transmitter is further configured to transmit the acknowledgement packet via the communication network.

20 Claims, 2 Drawing Sheets

SYSTEM AND METHOD FOR AVOIDING HIDDEN NODE COLLISIONS IN A COMMUNICATION NETWORK

CROSS-REFERENCE TO RELATED APPLICATIONS

The present application claims priority to U.S. Provisional Patent Application Nos. 61/808,885, filed on Apr. 5, 2013 and 61/831,377, filed on Jun. 5, 2013 each of which is hereby incorporated herein by reference in its entirety.

BACKGROUND

When two devices attempt to transmit on a communication network at the same time a collision can result and the transmissions may corrupt each other. The devices may retransmit the data corrupted by the collision, which reduces overall network efficiency. Communication networks employ various techniques to avoid or reduce the number of collisions occurring when different devices transmit concurrently. Carrier sense multiple access (CSMA) methods require that each device check the communication medium for traffic prior to initiating a transmission. CSMA with collision detection (CD) is employed in some networks (e.g., Ethernet) that are amenable to detection of simultaneous transmission by different devices. Using CSMA/CD, network devices monitor the medium for collisions while transmitting, and retransmit if a collision is detected. CSMA with collision avoidance (CA) is applied in some networks in which collision detection is impractical (e.g., networks compliant with IEEE 802.11 standards). Using CSMA/CA, network devices attempt to reduce the number of collisions by randomizing transmission start time relative to a previous transmission. Some communication networks reduce collisions by allowing a device to reserve the network for a time interval. During the reserved time interval only the reserving device may transmit on the network. If the reservation time is too long, network bandwidth may be wasted.

SUMMARY

A method and apparatus for avoiding hidden node collisions in a communication network are disclosed herein. In one embodiment, a network communication device includes a packet transmitter. The packet transmitter is configured to subdivide a packet to be transmitted via a communication network into a plurality of segments based on the packet exceeding a predetermined maximum size, and to sequentially transmit the segments via the communication network. The packet transmitter is also configured to construct an acknowledgement packet responsive to reception of each segment of a packet received via the communication network. The acknowledgement packet includes a field indicating whether an additional segment of the packet is to be transmitted via the communication network. The packet transmitter is further configured to transmit the acknowledgement packet via the communication network.

In another embodiment, a method includes receiving, by a first network communication device, a plurality of segments of a packet sequentially transmitted by a second network communication device. An acknowledgement packet is constructed by the first network communication device responsive to reception of each of the segments. The acknowledgement packet includes a field indicating whether an additional segment of the packet is to be transmitted via the communication network. The acknowledgement packet is transmitted by the first network communication device via the communication network.

In a further embodiment, a communication network includes a first communication device, a second communication device, and a third communication device communicatively coupled via the communication network. The second communication device is configured to subdivide a packet to be transmitted into a plurality of segments such that a first of the segments of the packet is smaller than any of the segments of the packet to be transmitted subsequent to the first of the segments. The subdivision is based on the packet exceeding a predetermined length. The second communication device is also configured to sequentially transmit the segments via the communication network. The first communication device is configured to receive the plurality of segments transmitted by the second network communication device, and to construct an acknowledgement packet responsive to reception of each of the segments. The acknowledgement packet includes a field indicating whether an additional segment of the packet is to be transmitted via the communication network. The first communication device is also configured to transmit the acknowledgement packet via the communication network. The third communication device is configured to receive the acknowledgement packet, and to disable transmission for an interval responsive to reception of the acknowledgement packet that includes the field, where the field indicates that an additional segment of a packet is to be transmitted via the communication network.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
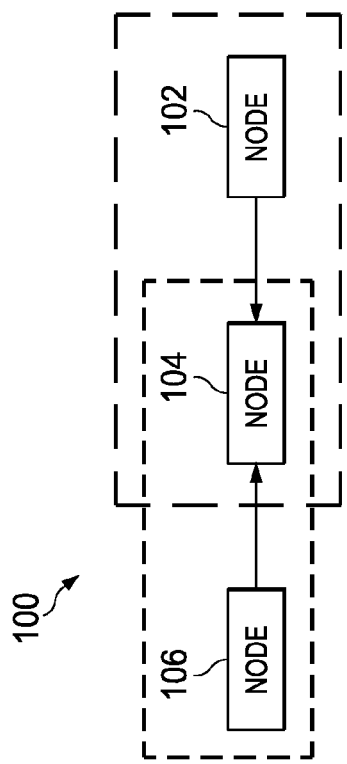
FIG. 1 shows a block diagram of a communication network in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors. The terms "frame" and "packet" are used interchangeably herein.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Some communication networks, such as power line communication networks (PLC) compliant with G3 standards, IEEE p1901.2 standards, etc., operate with a relatively small maximum transmission unit (MTU) size. In some networks, The MTU size may depend on the channel condition and modulation scheme used. In such networks, the medium access control (MAC) protocol is responsible for segmenting larger frames into multiple smaller segments based on the MTU size. All segments belonging to the same packet are transmitted back to back to the destination. During the transmission of such segments, if even one of the segments is lost or preempted due to a collision, then the transmission of the entire packet fails, and all segments of the packet are retransmitted causing a substantial loss in network reliability and performance.

To prevent another device (or node) from transmitting during the transmission of segments, some protocols employ a contention free slot (CFS). CFS prevents interruption of segment transmission by nodes that are aware of transmission. However, CFS does not protect from collisions caused by transmissions from hidden nodes. Losses due to collisions caused by a hidden node occur when a node (hidden node) which is not in the sensing region of a transmitting node but is in the sensing region of a receiving node transmits a frame during the time when segmented frames are being transmitted by the transmitting node.

One solution to hidden node collisions uses special frames called request to send (RTS) and clear to send (CTS). RTS and CTS frames are transmitted by the transmitter and receiver before transmitting a large data frame to inform the nodes in the sensing region of either the transmitter or receiver that the channel will be busy for a specified time. Each node detecting these frames adjusts its network allocation vector (NAV) so that the node refrains from transmission during the specified time, thereby preventing collisions with the packet transmission. Unfortunately, the use of additional RTS and CTS frames increases network overhead. Furthermore, if, after reserving the medium, the frame is not transmitted for some reason, the reservation results in underutilization of the channel.

Embodiments of the communication network disclosed herein provide improved efficiency by reducing hidden node collisions without increasing network overhead. Embodiments reduce hidden node collisions by providing per segment reservation of the network that effectively suppresses hidden node transmissions without use of RTS and CTS frames.

FIG. 1 shows a block diagram of a communication network 100 in accordance with various embodiments. The communication network 100 includes a plurality of nodes 102, 104, 106. The nodes 102-106 are network communication devices that are communicatively coupled through a communication medium of the network 100. In some embodiments, the network 100 may be a PLC network that communicatively couples the nodes 102-106 via conductors of a power distribution system. Other embodiments may employ a different communication medium (e.g., a wireless medium, dedicated conductors, etc.).

The nodes 102 and 104 are separated by a distance that allows the nodes 102 and 104 to directly communicate. That is, the node 102 can detect transmissions by the node 104, and vice versa, without benefit of an intervening repeater. Similarly, nodes 106 and 104 are separated by a distance that allows the nodes to directly communicate. However, the nodes 102 and 106 are separated by a distance that inhibits direct communication. Thus, the nodes 102 and 106 are hidden from one another, and concurrent transmission by nodes 102 and 106 may collide and corrupt the signals detected by the node 104, which is within range of both of the nodes 102 and 106.

In embodiments of the network 100, when a node transmits a segmented frame, the node receiving the frame transmits an acknowledgment (ACK) frame on reception of each segment. The ACK frame includes a field that notifies each node detecting the ACK frame of whether an additional segment is to be transmitted by the transmitting node. Nodes detecting the ACK frame extract the additional segment information from the ACK frame, and if transmission of an additional segment is indicated, refrain from transmission for a time period sufficient for transmission and acknowledgement of the additional segment, thereby avoiding collisions with regard to the additional segment.

Figure 2:
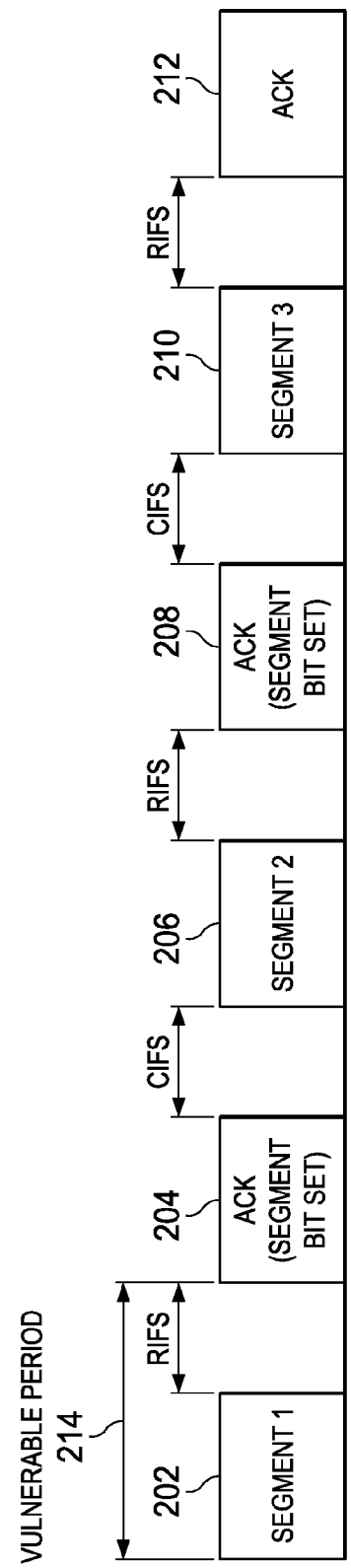
FIG. 2 shows a segmented frame transmission with hidden node collision avoidance in accordance with various embodiments.

FIG. 2 shows a segmented frame transmission with hidden node collision avoidance in accordance with various embodiments. For purposes of illustration, the segmented frame may be transmitted by the node 102 and addressed to the node 104. The node 102 partitions the frame into three segments SEG 1 202, SEG 2 206, and SEG 3 210. The node 102 transmits the first segment SEG 1 202 and awaits an ACK frame. The node 104 receives SEG 1 202 and after a predetermined delay transmits the ACK frame 204. The ACK frame 204 includes a value that indicates that an additional segment is to be transmitted by the node 102. The time period from the start of transmission of SEG 1 202 to the start of transmission of the ACK frame 204 (interval 214) is vulnerable to a hidden node collision because the node 106 does not know that the node 102 is transmitting. To reduce the interval of vulnerability 214, the node 102 (i.e., a node transmitting a segmented frame) may, when partitioning the frame, minimize the length of the first segment transmitted (SEG 1 202).

On detection of the ACK frame 204, the node 106 determines that an additional segment is to be transmitted by the node 102 and refrains from transmission for an interval sufficient for the node 102 to transmit segment SEG 2 206 without collision. Node 102 receive the ACK frame 204 and transmits segment SEG 2 206. Node 104 receives segment SEG 2 206 and transmits ACK frame 208, which includes a value that indicates that an additional segment is to be transmitted by the node 102.

On detection of the ACK frame 208, the node 106 determines that an additional segment is to be transmitted by the node 102 and refrains from transmission for an interval sufficient for the node 102 to transmit segment SEG 3 210.

Node 102 receive the ACK frame 208 and transmits segment SEG 3 210. Node 104 receives segment SEG 3 210 and transmits ACK frame 212. ACK frame 212 indicates that no additional segment is to be transmitted by the node 102. On detection of the ACK frame 212, the node 106 determines that no additional segment is to be transmitted by the node 102 and that the node 106 is free to transmit.

Thus, embodiments of the network 100 reduce the incidence of hidden node collisions by including in the ACK frames a field that indicates whether an additional segment is to be transmitted. Nodes receiving the ACK frame (other than the node transmitting the segmented frame) refrain from transmitting based on the field for an interval that allows transmission of an additional segment without collision. The node transmitting the segmented frame may further reduce the likelihood of collision by minimizing the length of the first segment of the segmented frame.

Figure 3:
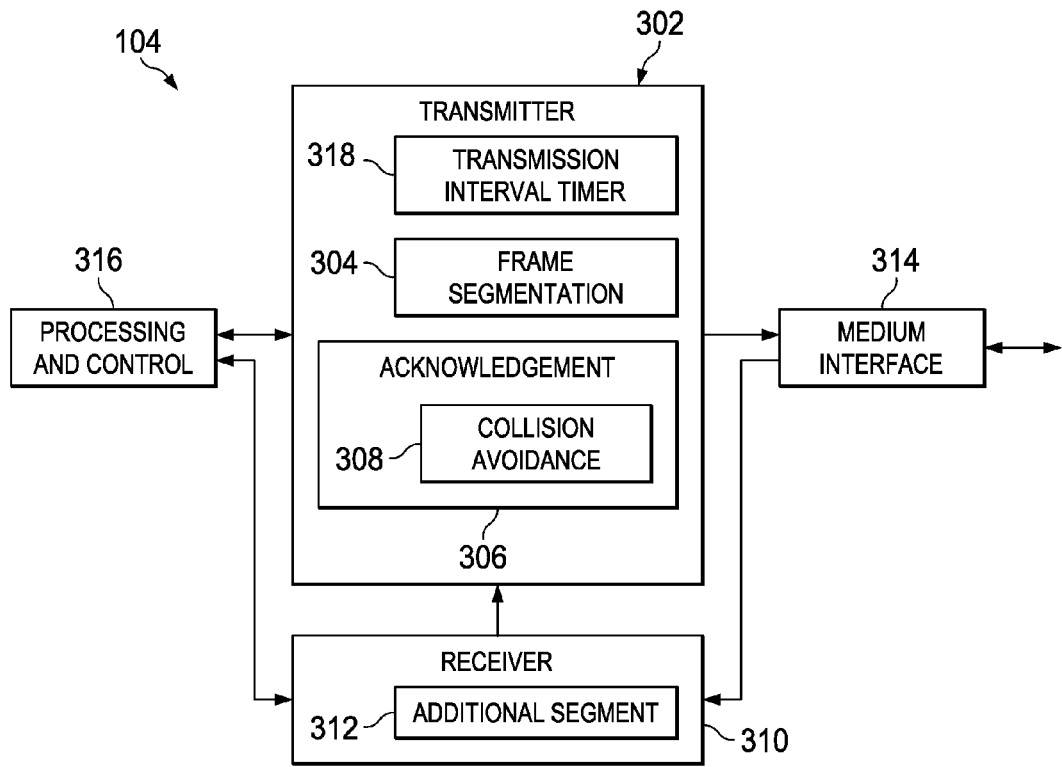
FIG. 3 shows a block diagram of a network communication device that provides hidden node collision avoidance in accordance with various embodiments.

FIG. 3 shows a block diagram of a network communication device (node) 104 that provides hidden node collision avoidance in accordance with various embodiments. The nodes 102, 106, and other devices communicating via the network 100 may be similar or identical to the node 104. The device 104 includes a transmitter 302, a receiver 310, a medium interface 314, and a processing and control system 316. The device 104 may include various other components and systems that have been omitted from FIG. 3 for the sake of clarity. For example, the device 104 may include a power system (battery, power supply, etc.), a timing generation system (oscillators, synthesizers, etc.), sensors, and various other components and systems.

The medium interface 314 includes an antenna and other physical layer circuitry for interfacing the device 104 to the communication medium of the network 100. For example, the medium interface 314 may include circuitry for driving signals onto, and detecting signals transmitted via, a power conductor of an electrical power distribution system.

The processing and control system 316 includes circuitry and logic that generates data (e.g., frames/packets) for transmission via the network 100, and that processes data received via the network 100. The processing and control system 316 may include a processor and storage for instructions executed by the processor. A processor suitable for use in the processing and control system 316 may include a general-purpose microprocessor, digital signal processor, microcontroller, or other device capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

Instruction storage suitable for use in the processing and control system 316 is a non-transitory computer-readable storage medium suitable for storing instructions executable by a processor. Such storage may include volatile storage such as random access memory, non-volatile storage (e.g., a hard drive, an optical storage device (e.g., CD or DVD), FLASH storage, read-only-memory), or combinations thereof.

The transmitter 302 prepares data for propagation via the network 100. The transmitter 302 includes frame segmentation logic 304 and acknowledgement logic 306. The transmitter 302 may include other logic that is not shown in FIG. 3 for the sake of brevity. For example, the transmitter 302 may include encoding logic, scrambling logic, and/or interleaving logic that encodes data, scrambles data, or interleaves data to be transmitted in accordance with a standard applicable to the network 100.

The frame segmentation logic 304 determines whether the size of a data packet exceeds the MTU size allowable for the network 100. If the packet size exceeds the MTU size, then the frame segmentation logic 304 partitions the packet into a plurality of segments, where the size of each segment is less than the MTU size. In some embodiments, the frame segmentation logic 304 partitions the packet such that an initially transmitted segment of the packet is of minimum size, or smaller than subsequent segments of the packet, to reduce the likelihood of a hidden node collision during transmission of the initial segment. The transmitter 302 provides the segments, in sequence, to the medium interface 314 for propagation via the communication medium of the network 100.

The acknowledgement logic 306 generates an ACK frame transmission when the receiver 310 indicates that a segment addressed to the device 104 has been received. The acknowledgement logic 306 receives information from the receiver 310 indicating whether an additional segment of the packet is to be transmitted by the device that transmitted the last received segment. If an additional segment is to be transmitted, then the acknowledgement logic 306 constructs an ACK frame that includes an indication of the expected additional segment transmission. If an additional segment is not to be transmitted, then the acknowledgement logic 306 constructs an ACK frame that includes an indication that no additional segment transmission is expected.

In some embodiments, the acknowledgement logic 306 may also include in the ACK frame a time value specifying the time for which a device that is not transmitting the segmented packet should refrain from transmitting. In other embodiments, the time value may be defined as a constant value in each device. When employed in conjunction with a standard such as G3/IEEE 1901.2, the time value may, for example, be set to the extended inter frame space time.

The receiver 310 processes signals detected by the medium interface 314 to extract information encoded in the signals. The receiver 310 includes additional segment logic 312 that determines whether transmission of an additional segment is to follow the last received segment. For example, each segment transmission may include information indicating whether an additional segment is to be transmitted. The additional segment logic 312 may extract such information from the received segment. The additional segment logic 312 may provide to the acknowledgement logic 306 an indication of whether an additional segment is to be transmitted. The receiver 310 may include other logic that is not shown in FIG. 3 for the sake of brevity. For example, the receiver 310 may include decoding logic, descrambling logic, and/or deinterleaving logic that decodes, descrambles, or deinterleaves data received in accordance with a standard applicable to the network 100.

The additional segment logic 312 may also inspect each received ACK frame to determine whether the ACK frame indicates that transmission of an additional segment is expected by the device that transmitted the ACK frame. The additional segment logic 312 may provide the indication of an expected additional segment transmission to the transmitter 302. If the received ACK frame indicates that an additional segment is to be transmitted, and the device 104 is not the device transmitting the segmented frame, then the transmitter 302 refrains from transmitting for a time interval sufficient to allow transmission of the additional segment without collision. The time interval may be determined by a segment transmission interval timer 318 that expires at a time after the transmission of the additional segment and/or transmission of an ACK frame acknowledging the additional segment are expected to have been completed. If the received ACK frame indicates that an additional segment is not to be transmitted, then the transmitter 302 is free to transmit in accordance with the protocols governing exchanges on the network 100.

In some embodiments of the device 104, at least some portions of the transmitter 302 and/or the receiver 310 may be integrated with the processing and control system 316. For example, a processor of the processing and control system 316 may provide at least a portion of the functionality of the frame segmentation logic 304, the acknowledgement logic 306, the segment transmission interval timer 318, and/or the additional segment logic 312. The functionality of the frame segmentation logic 304, the acknowledgement logic 306, the segment transmission interval timer 318, and/or the additional segment logic 312 may also be implemented using dedicated circuitry, or a combination of dedicated circuitry and a processor executing instructions retrieved from memory.

Figure 4:
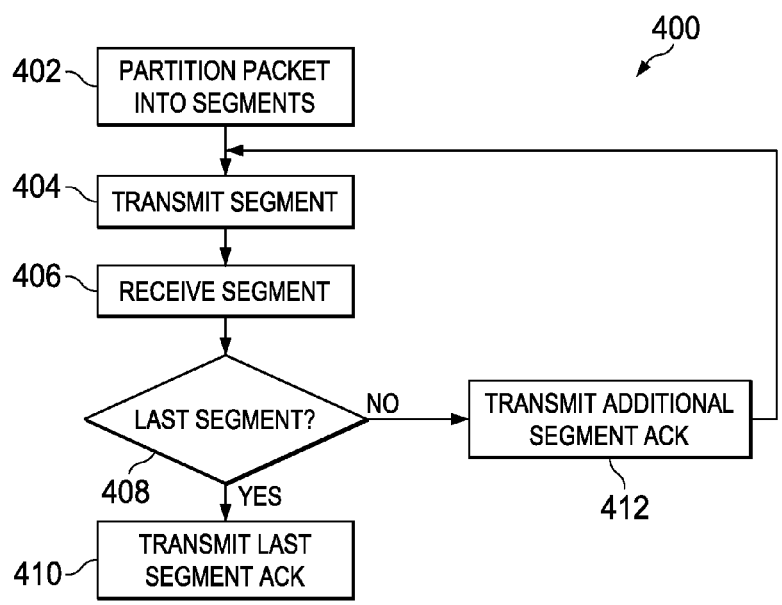
FIG. 4 shows a flow diagram for a method for segmented frame transmission with hidden node collision avoidance in accordance with various embodiments.

FIG. 4 shows a flow diagram for a method 400 for segmented frame transmission with hidden node collision avoidance in accordance with various embodiments. Though depicted sequentially as a matter of convenience, at least some of the actions shown can be performed in a different order and/or performed in parallel. Additionally, some embodiments may perform only some of the actions shown. In the method 400, the nodes 102, 104, 106 are connected via the network 100.

In block 402, the node 102 prepares a packet for transmission to the node 104 via the network 100. The size of the packet exceeds the MTU of the network 100, and node 102 partitions the packet into a plurality of segments. The node 104 may partition the packet such that the segment to be transmitted first is of minimum size, thereby reducing the likelihood of a collision between the first transmitted segment and a transmission from node 106. Node 106 is hidden from node 102.

In block 404, the node 102 transmits a segment of the segmented packet via the network 100.

In block 406, the node 104 receives the segment transmitted by node 102.

In block 408, the node 104 examines the information received and determines whether the received segment is the last segment of the packet (i.e., no additional segment transmission is expected).

If transmission of an additional segment is expected, then, in block 412, the node 104 constructs an ACK frame with a field indicating that the additional segment is expected. The node 104 transmits the ACK frame. The nodes 102 and 106 receive the ACK frame. The node 106 examines the ACK frame, and based on the field refrains from transmitting for an interval sufficient to allow the node 102 to transmit the additional segment without collision. The node 102 receives the ACK frame, and in block 404 transmits an additional segment of the packet.

If, in block 408, transmission of an additional segment is not expected, then, in block 410, the node 104 constructs an ACK frame with a field indicating that no additional segment is expected. The node 104 transmits the ACK frame. The nodes 102 and 106 receive the ACK frame. The node 106 examines the ACK frame, and based on the field may initiate transmission as soon as the protocol governing the network 100 allows.

In some embodiments of the ACK frame constructed by the acknowledgement logic 306, the indication of whether an additional segment transmission is expected may be included in a field of a header of the ACK frame. The header may be a frame control header. In some embodiments, the field and frame control header may be defined as shown in one of the exemplary headers below. Some embodiments may employ a different frame control header format and/or different additional segment field encoding.

| Header 1: Additional Segment Notification in expSegmentedTransmission Field | | | | |
|---|---|---|---|---|
| Field | Byte | Bit Number | Bits | Definition |
| PDC | 0 | 7 to 0 | 8 | Phase detection counter |
| MOD | 1 | 7 to 5 | 3 | Modulation type 0: ROBO 1: DBPSK 2: DQPSK 3: D8PSK 4: 16-QAM 5-7: Reserved |
| Payload Modulation Scheme | 1 | 4 | 1 | 0: Differential 1: Coherent Note: The coherent modulation scheme, specified in clause 7.16, is optional. |
| DT | | 3 to 1 | 3 | Delimiter type: 000: Start of frame with no response expected 001: Start of frame with response expected 010: Positive acknowledgement (ACK) 011: Negative acknowledgement (NACK) 100-111: Reserved by ITU-T |
| FL | 2 | 0 7 to 0 | 1 8 | PHY frame length in PHY symbols. FL represents the number of symbols in the frame |
| TM[7:0] | 3 | 7 to 0 | 8 | TM[7:0]: Tone map |
| TM[15:8] | 4 | 7 to 0 | 8 | TM[15:8]: Tone Map |
| TM[23:16] | 5 | 7 to 0 | 8 | TM[23:16]: Tone Map |
| Reserved | 6 | 7 to 0 | 8 | Reserved |
| expSegmentedTransmission | 7 | 7 | 1 | If set to 1 informs nodes that the receiver is expecting additional segments from the transmitter |
| Reserved | 7 | 6 | 1 | Reserved |
| FCCS | 7-8 8 | 5 to 0 7 to 6 | 6 2 | Frame control check sequence (CRC8) |
| ConvZeros | 8 | 5 to 0 | 6 | Zeros for convolutional encoder |

| Header 2: Additional Segment Notification in Delimiter Type Field | | | | |
|---|---|---|---|---|
| Field | Byte | Bit Number | Bits | Definition |
| PDC | 0 | 7 to 0 | 8 | Phase detection counter |
| MOD | 1 | 7 to 5 | 3 | Modulation type 0: ROBO 1: DBPSK 2: DQPSK 3: D8PSK 4: 16-QAM 5-7: Reserved by ITU-T |

-continued

Header 2: Additional Segment Notification in Delimiter Type Field

| Field | Byte | Bit Number | Bits | Definition |
|---|---|---|---|---|
| Payload Modulation Scheme | 1 | 4 | 1 | 0: Differential<br>1: Coherent<br>Note: The coherent modulation scheme, specified in clause 7.16, is optional. |
| DT | | 3 to 1 | 3 | Delimiter type:<br>000: Start of frame with no response expected<br>001: Start of frame with response expected<br>010: Positive acknowledgement (ACK)<br>011: Negative acknowledgement (NACK)<br>100-101: Reserved by ITU-T<br>110 - ACKwithExpNextSegment<br>111 - NACKwithExpNextSegment |
| FL | | 0 | 1 | PHY frame length in PHY symbols. FL represents the number of symbols in the frame |
| | 2 | 7 to 0 | 8 | |
| TM[7:0] | 3 | 7 to 0 | 8 | TM[7:0]: Tone map |
| TM[15:8] | 4 | 7 to 0 | 8 | TM[15:8]: Tone Map |
| TM[23:16] | 5 | 7 to 0 | 8 | TM[23:16]: Tone Map |
| Reserved | 6 | 7 to 0 | 8 | Reserved by ITU-T |
| expSegmentedTransmission | 7 | 7 | 1 | If set to 1 informs nodes that the receiver is expecting additional segments from the transmitter |
| Reserved | 7 | 6 | 1 | Reserved by ITU-T |
| FCCS | 7-8 | 5 to 0 | 6 | Frame control check sequence (CRC8) |
| | 8 | 7 to 6 | 2 | |
| ConvZeros | 8 | 5 to 0 | 6 | Zeros for convolutional encoder |

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A network element comprising:
a transceiver; and
a processing unit coupled to the transceiver and configured to:
receive a first acknowledgment packet from a first network element, wherein the first acknowledgement packet is transmitted by the first network element in response to receiving a first data packet from a second network element,
determine whether the first acknowledgement packet includes a first indicator indicating the network element to refrain from transmitting data to the first network element, and
upon determining that the first indicator indicating the network element to refrain from transmitting data to the first network element, refrain from transmitting data to the first network element.

2. The network element of claim 1, wherein the first indicator indicating at least one of:
the first data packet is a segment of a second data packet,
that the first network element is expecting further data packets from the second network element, and
a time value specifying a time interval during which the network element to refrain from transmitting data to the first network element.

3. The network element of claim 1, wherein the processing unit is further configured to
receive a second acknowledgement packet from the first network element, wherein the second acknowledgement packet is transmitted by the first network element to the second network element,
determine whether the second acknowledgement packet includes a second indicator indicating that the network element can transmit data to the first network element.

4. The network element of claim 3, wherein the second indicator indicating that the first network element is not expecting further data packets from the second network element.

5. The network element of claim 1, wherein the network element is not communicatively coupled to the second network element.

6. A network element comprising:
a transceiver; and
a processing unit coupled to the transceiver and configured to:
receive a first data packet from a first network element, and
transmit a first acknowledgement packet in response to receiving the first data packet from the first network element, wherein the first acknowledgement packet includes a first indicator indicating a second network element to refrain from transmitting data to the network element.

7. The network element of claim 6, wherein the first indicator indicating at least one of:
the first data packet is a partial segment of a second data packet,
the network element is expecting further data packets from the first network element, and
a time value specifying a time interval during which the second network element to refrain from transmitting data to the network element.

8. The network element of claim 6, wherein the processor is further configured to:
receive a second data packet from the first network element, and
transmit a second acknowledgement packet in response to receiving the second data packet from the first network element, wherein the second acknowledgement packet includes a second indicator indicating that the second network element can transmit data to the network element.

9. The network element of claim 8, wherein the second indicator indicating that the network element is not expecting further data packets from the first network element.

10. The network element of claim 6, wherein the first network element is not communicatively coupled to the second network element.

11. A method comprising:
receiving at a first network element, a first acknowledgment packet from a second network element, wherein the first acknowledgement packet is transmitted by the second network element in response to receiving a first data packet from a third network element,
determining whether the first acknowledgement packet includes a first indicator indicating the first network element to refrain from transmitting data to the second network element, and upon determining that the first indicator indicating the first network element to refrain from transmitting data to the second network element, refraining from transmitting data to the second network element.

12. The method of claim 11, wherein the first indicator indicating at least one of:
the first data packet is a partial segment of a second data packet,
that the second network element is expecting at least one more data packet from the third network element, and
a time value specifying a time interval during which the first network element to refrain from transmitting data to the second network element.

13. The method of claim 11, further comprising:
receiving a second acknowledgement packet from the second network element, wherein the second acknowledgement packet is transmitted by the second network element in response to receiving the at least one more data packet from the third network element; and
determining whether the second acknowledgement packet includes a second indicator indicating that the first network element can transmit data to the second network element.

14. The method of claim 13, wherein the second indicator indicating that the second network element is not expecting any further data packets from the third network element.

15. The method of claim 11, wherein the first network element is not communicatively coupled to the third network element.

16. A method comprising:
receiving a first data packet at a first network element from a second network element, and
transmitting a first acknowledgement packet to the second network element, wherein the first acknowledgement packet includes an indicator indicating a third network element to refrain from transmitting data to the first network element.

17. The method of claim 16, wherein the first indicator indicating at least one of:
the first data packet is a segment of a second data packet,
the first network element is expecting further data packets from the second network element, and
a time value specifying a time interval during which the third network element to refrain from transmitting data to the first network element.

18. The method of claim 16, further comprising:
receiving a second data packet at the first network element from the second network element, and
transmitting a second acknowledgement packet to the second network, wherein the second acknowledgement packet includes a second indicator indicating that the third network element can transmit data to the first network element.

19. The method of claim 18, wherein the second indicator indicating that the first network element is not expecting further data packets from the second network element.

20. The method of claim 16, wherein the second network element is not communicatively coupled to the third network element.

* * * * *